US012722319B2

(12) United States Patent
Stachel

(10) Patent No.: US 12,722,319 B2
(45) Date of Patent: Sep. 1, 2026

(54) SLICING MACHINE WITH SPRAY BAR

(71) Applicant: MULTIVAC SEPP HAGGENMUELLER SE & CO. KG, Wolfertschwenden (DE)

(72) Inventor: Tom Stachel, Kempten (DE)

(73) Assignee: Multivac Sepp Haggenmueller SE & Co. KG, Wolfertschwenden (DE)

( * ) Notice: Subject to any disclaimer, the term of this patent is extended or adjusted under 35 U.S.C. 154(b) by 217 days.

(21) Appl. No.: 18/232,384

(22) Filed: Aug. 10, 2023

(65) Prior Publication Data

US 2024/0058981 A1 Feb. 22, 2024

(30) Foreign Application Priority Data

Aug. 22, 2022 (DE) ......................... 102022121161.4

(51) Int. Cl.
*B26D 7/34* (2006.01)
*B26D 7/32* (2006.01)

(52) U.S. Cl.
CPC ................. *B26D 7/34* (2013.01); *B26D 7/32* (2013.01); *B26D 2210/02* (2013.01)

(58) Field of Classification Search
CPC . B26D 7/34; B26D 7/088; B26D 7/32; B26D 2210/02
USPC ........................................................... 83/24
See application file for complete search history.

(56) References Cited

U.S. PATENT DOCUMENTS

| | | | | |
|---|---|---|---|---|
| 4,246,838 A * | 1/1981 | Pulver .................... | A21C 11/12 425/103 |
| 4,458,626 A | 7/1984 | Dessilani | |
| 12,076,880 B2 * | 9/2024 | Reichard ................ | B26D 7/325 |
| 2010/0310778 A1 * | 12/2010 | Shioi ..................... | B05B 12/122 118/313 |

(Continued)

FOREIGN PATENT DOCUMENTS

| | | |
|---|---|---|
| CN | 215472257 U * | 1/2022 |
| DE | 32 41 127 A1 | 5/1983 |
| DE | 10 2007 048 015 A1 | 4/2009 |

(Continued)

OTHER PUBLICATIONS

German Search Report (with English Machine Translation) Dated Mar. 13, 2023, Application No. 10 2022 121 161.4, Applicant Multivac Sepp Haggenmüller SE & Co. KG, 16 Pages.

(Continued)

*Primary Examiner* — Nhat Chieu Q Do
(74) *Attorney, Agent, or Firm* — Brooks Kushman P.C.

(57) ABSTRACT

A multi-track slicing machine, for slicing calibers into slices and producing shingled or stacked portions from slices, comprises a cutting unit, a feed unit for feeding at least one caliber to the cutting unit, a discharge conveyor unit with at least one portioning belt for discharging the portions in a passage direction of the slicing machine, and a spray unit with a plurality of nozzle units, wherein each nozzle unit comprises at least one spray nozzle for applying a liquid or powdery anticaking agent to a slice. The spray unit comprises a holding device, and a spray bar adjustably fastened to the holding device and extending in a horizontal transverse direction to the passage direction across all tracks of the slicing machine. The nozzle units are arranged independently of one another adjustably on the spray bar.

20 Claims, 11 Drawing Sheets

(56) References Cited

U.S. PATENT DOCUMENTS

| | | | |
|---|---|---|---|
| 2022/0134590 | A1 | 5/2022 | Reichard et al. |

FOREIGN PATENT DOCUMENTS

| | | | | | |
|---|---|---|---|---|---|
| DE | 102022108508 | A1 | | 10/2023 | |
| EP | 1525804 | A1 | | 4/2005 | |
| EP | 2 353 728 | A1 | | 8/2011 | |
| EP | 3450103 | A1 | * | 3/2019 | ............... B05B 1/14 |
| EP | 3991929 | A1 | | 5/2022 | |

OTHER PUBLICATIONS

German Office Action, Application No. 102022121161.4, Applicant: Multivac Sepp Haggenmuller SE & Co. KG, dated Feb. 22, 2024 (with English machine translation) (14 pages).

* cited by examiner

SLICING MACHINE WITH SPRAY BAR

CROSS-REFERENCE TO RELATED APPLICATIONS

This application claims priority to German Patent Application No. DE 102022121161.4 filed on Aug. 22, 2022, the disclosure of which is incorporated in its entirety by reference herein.

TECHNICAL FIELD

The invention relates to slicing machines, in particular so-called slicers, which are used in the food industry to slice strands of an only slightly compressible product such as sausage or cheese.

BACKGROUND

Since these strands can be produced with a cross section that retains its shape and dimensions well over its length, i.e., essentially constant, they are called product calibers.

In most cases, several product calibers arranged parallel to each other on individual tracks are sliced simultaneously by cutting off one slice at a time by the same blade, which moves in a direction transverse to the longitudinal direction of the product calibers.

The product calibers are pushed forward by a feed conveyor of a cutting unit in the direction of the blade of the cutting unit, usually on an obliquely downwardly directed feed conveyor, and are each guided through the product openings of a plate-shaped, so-called cutting frame, at the front end of which the part of the product caliber projecting beyond it is cut off as a slice by the blade directly in front of the cutting frame.

The slices generally fall onto a first discharge conveyor, the so-called portioning belt, as part of a discharge unit, by means of which the individual slices are also collected into shingled or stacked portions on the portioning belt and transported away for further processing.

In such portions, where the slices at least partially overlap, there is the problem that, depending on the material, the slices sometimes adhere to each other so strongly that the customer cannot separate them without additional measures.

In this case, either a so-called interleaver in the form of a sheet of paper or film is placed between the individual slices as a separating aid when preparing the portion, or a liquid or powdery anticaking agent is applied to the contact surface of the slice by means of a spray unit.

In addition, the application of a liquid or powder wetting agent to the main surface of the slice may also be desired for other reasons, for example for hygienic reasons.

For multi-track slicing machines, it is already known from EP 3 991 929 A1 to use one nozzle unit per track and to attach the multiple nozzle units to a support beam running through the machine transversely to the feed direction at transverse positions corresponding to the individual tracks.

However, such slicing machines, in particular slicers, are often configured or modified differently from one job to the next with respect to, for example, the number of tracks, their transverse spacing, the inclination and height position of the portioning belt, etc.

SUMMARY

It is therefore the object according to the invention to provide a slicing machine, in particular a slicer, with a spray unit, which is easily and quickly adaptable to its different configurations, in particular the number and transverse spacing of the tracks, as well as a construction kit for creating such a spray unit (and a method for operating such a slicing machine).

A generic slicing machine, such as a slicer, for slicing a plurality of calibers lying parallel to one another in different tracks and depositing the slices in shingled or stacked portions typically comprises:

- a cutting unit with a preferably rotating blade, usually a sickle blade, whose cutting edge on the outer circumference increases in its distance from the center of rotation opposite to the direction of rotation,
- a feed unit for feeding the at least one caliber to be cut to the cutting unit, and
- a discharge unit, on whose first belt in the discharge direction, the portioning belt, the slices are deposited one after the other in portions, as well as
- a control for controlling at least the moving parts of the slicing machine.

In particular, in order to minimize the adhesion of the slices within the portions and to facilitate the removal of individual slices for the consumer, a liquid or powdery anticaking agent—or also a wetting agent for another purpose—is applied between the slices of a portion either before the next slice is placed on the upper side of the preceding slice and/or before the next slice hits to the lower side thereof. In the following, we will refer only to an anticaking agent, which is intended to include other wetting agents.

For this purpose, the slicing machine comprises a spray unit with at least one nozzle unit, each comprising at least one spray nozzle for applying the anticaking agent. The spray unit is usually located at an angle between the obliquely overhanging front surface of the cutting frame—which usually forms part of the feed unit—or the cutting plane in which the cutting edge of the blade moves, and the portioning belt.

Spray unit and spray nozzle are understood to mean any unit or nozzle by means of which an anticaking agent can be applied, irrespective of whether it is a nozzle in the classic sense with a narrowing orifice and irrespective of whether the anticaking agent is applied under pressure.

A simple, pressure-less trickling of a powdered or liquid anticaking agent, e.g., onto the upper side of the last deposited slice, can also be effected by such a spray unit, but in practice the anticaking agent must be moved against the slice at a considerable speed—much higher than the falling speed from a low elevation of at most 30 cm—because the time available for applying the anticaking agent is very short.

In the case of pressurized application, the anticaking agent—whether liquid or powder—is often finely atomized with the aid of compressed air or another pressurized medium with the aid of the spray nozzle, for which, in addition to the anticaking agent itself, the spray nozzle must also be supplied with this pressurized medium—referred to below as compressed air, irrespective of the type of pressurized medium—via a corresponding supply line. An alternative procedure, especially in the case of liquid anticaking agents, is to pressurize the anticaking agent directly and thus to apply it under pressure, i.e., without using a separate pressurized medium.

The basic idea of the invention is to be able to quickly and easily adjust the number of Claims beam-mounted or of the nozzle units used and thus of the nozzles, as well as their position in the transverse direction and their spray direction to the respective work order and the correspondingly configured slicers.

According to the invention, the spray unit therefore comprises a spray bar which extends with its greatest direction of extension, its longitudinal direction—usually running in the horizontal transverse direction of the slicing machine—across all tracks of the slicing machine and to which the nozzle units are attached in such a way that they can be adjusted independently of one another.

The spray bar is attached to the base frame of the machine by means of a holding device and, in particular, is adjustably attached to the holding device.

The nozzle units, which can thus be adjusted independently of one another both relative to the spray bar and relative to one another, can preferably each be adjusted and fixed to the spray bar by means of a fixing device and can thus—in particular together with the fixing device—be adjusted and fixed to the spray bar in the horizontal transverse direction and/or transversely to this transverse direction—as viewed in plan, i.e., in the passage direction or against the passage direction.

The adjustment transverse to the transverse direction, in particular transverse to the longitudinal direction of the spray bar, relates in particular to the radial direction in which the nozzle unit projects from the longitudinal direction of the spray bar and thus also to the spray direction of the one or more spray nozzles mounted in the spray unit.

By the adjustability in transverse direction the nozzle units can be adjusted to the transverse position of the respective, in particular used, tracks of the slicing machine, and by the adjustment of the rotational position around the longitudinal direction of the spray bar the spray direction can be adjusted in such a way that track-individually the spray direction of each nozzle unit, in particular of each of possibly several nozzles there, is directed to the intended target point on the surface of the sliced slice or the front face of the caliber to be cut.

Such a track-individual adjustability is particularly necessary if different calibers are cut on the individual tracks, which differ either from the size and shape of their cross-sectional area and/or also from the material of the caliber, in particular its adhesion.

As a result, nozzle units not required for the current job can either be completely removed from the spray bar or moved transversely towards one of the ends of the spray bar to a deactivated position away from the active tracks of the machine, and then their nozzles naturally are not used.

For complete removal, the supply lines are disconnected by means of their clutches located either at or near the nozzle unit or at or near the distribution box.

In this way, even defective spray nozzles or their nozzle unit can be easily and quickly replaced without removing the entire spray bar from the machine.

In addition, the nozzle unit can be designed to be adjustable and fixable transversely to the longitudinal direction of the spray bar relative to the fastening device and thus to the spray bar.

On the one hand, this changes the distance of the spray nozzle from the spray bar, and thus also the distance of the spray nozzle from the point of impact on the slice or front surface of the caliber, which changes the size of the impact area with which the generally conical spray jet of the applied anticaking agent impinges on the slice or front surface of the caliber. For example, the nozzle unit can be displaced radially with respect to the spray bar on the holding device which supports the nozzle unit, and can be displaced and fixed along guides.

If—which is particularly useful in the case of several nozzles in a nozzle unit—the spraying direction of the individual nozzles is to be adjustable relative to the unit housing, this can be done by means of the fixing device of the individual nozzles relative to the unit housing, in particular its wall through which the nozzle passes.

Preferably, each nozzle unit comprises a tightly closable, hollow unit housing, the spray nozzle being arranged in a passage of one of the walls, in particular the peripheral wall, of the unit housing.

The unit housing is preferably trough-shaped and can be closed by a tightly attachable and fixable housing cover.

This means that the contacts of the individual supply lines for the media required at the nozzle, such as anticaking agent, compressed air and electrical current, are protected in the unit housing. These supply lines can either pass through the wall of the unit housing in a sealed manner or end there in clutches in a respective passage in the wall of the unit housing, to which the externally supplied supply lines can be attached.

Preferably, a distribution box is provided for distributing the media required by the individual spray nozzles—which may also include electrical signals for data transmission—by splitting the central supply lines led to the distribution box and feeding them preferably with a single external supply line each between the distribution box and each of the nozzles in the individual nozzle units.

Preferably, the distribution box is also attached to the spray bar, and preferably is also adjustable relative to the spray bar.

The adjustability can concern the adjustability in transverse direction but also the rotational position around the longitudinal direction of the spray bar.

The shut-off valves in each individual nozzle unit or even nozzle supply line required to control the application of the anticaking agent can either be located in the distribution box—which, however, increases the distance downstream of the shut-off valve to the nozzle—or better directly in the unit housing, which allows more precise control of the start and end of the application of the anticaking agent.

The external supply lines from the distribution box to the individual nozzle units—which can preferably branch within the unit housing to the possibly plurality nozzles mounted therein—are either routed along the spray bar or can also be accommodated protected inside a high bar part of the spray bar, in which case the individual unit housings preferably adjoin the hollow beam part as directly as possible, and the passage opening in the wall of this hollow beam part is preferably an oblong hole aligned in the longitudinal direction of the spray bar, which can be closed off as far as possible by movable closure elements such as bristles or a closure plate fastened to the unit housing.

The one or possibly more reservoirs for the anticaking agent can also be attached to the spray bar, either directly to the spray bar or to the distribution box.

By adjusting the reservoirs along the longitudinal direction of the spray bar, the length of the required supply lines to the distribution box or the individual nozzle units is kept short.

By pivoting the reservoir or its fastening device about the longitudinal direction of the spray bar, it can be achieved, for example, that in the case of a reservoir in the form of a bottle, it is held on the spray bar with the neck downwards during operation, but for changing an empty bottle, it is rotated about its longitudinal direction in such a way that it points with the neck upwards and can thus be easily exchanged for a full bottle.

Preferably, the spray bar is attached to the holding device in a cantilevered manner on one side, i.e., it is fixed to the holding device preferably only at one point along its longitudinal direction, in particular at one of its end sections, which facilitates mounting and dismounting of the entire spray bar on and from the holding device, in particular if the connections for the external supply lines are also arranged in the same end section of the spray bar, in particular in the end face of the spray bar there.

The spray direction is understood to be the main direction of exit of the medium from the spray nozzle, which usually emits a 2-dimensional spray fan or 3-dimensional spray cone with anticaking agent, i.e., the geometric center jet of this spray formation.

In order to facilitate the alignment of such an adjustable spray nozzle and/or the entire nozzle unit and/or the entire spray bar, one or also each of the spray nozzles may have a non-contact pointing device which indicates the spray direction of the nozzle, e.g., emits a light beam which coincides with the spray direction or runs parallel to it at a close distance so that it impingement point is visible on the slice or front surface of the caliber.

Thus, a simple laser pointer, which emits a visible laser beam, can be assigned to the corresponding one of the nozzle units or even to the individual spray nozzle as described, in particular be a component of each nozzle unit, whereby such a laser pointer is also preferably arranged protected inside the hollow unit housing, and in particular penetrates the pressure-tight but light-transmissive closed outlet opening of the light beam—usually a lens—on or in the wall of the spray bar.

Of course, the laser pointer must be attached to the nozzle unit of the adjustable spray nozzle in such a way that when the spray direction of the spray nozzle is adjusted, also the direction of the light beam emitted by the laser pointer changes analogously.

Preferably, each of the nozzle units is attached to an intermediate plate separate for each spray nozzle, for example screwed to it, and the corresponding intermediate plate together with the spray nozzle is attached, in particular screwed, to the wall of the spray bar.

In order to provide the screw connection of the intermediate plate protected from the wall of the spray bar—which should also be designed to be sealed against liquid—inside the unit housing, it is advisable to screw the intermediate plate from the inside of the hollow spray bar.

The holding device for the spray bar is preferably—like the spray bar—beam-shaped and has a largest extension direction, which is referred to as the longitudinal direction of the holding device and usually lies in a plane which also includes the passage direction through the machine.

Such a beam-shaped holding device is with its one end, the rear end, detachably fastened to a part of the base frame of the slicing machine, preferably clampable and thus continuously adjustable along an elongated supporting part of the base frame.

In the other end section, the front end section, the holding device carries the spray bar, which is pivotable and adjustable relative to the holding device, preferably on the one hand along its longitudinal direction relative to the point of attachment of the holding device to the base frame and/or pivotable and adjustable relative to the holding device about its own longitudinal direction.

In this way, the distance and/or the spray direction for all spray nozzles can be adjusted simultaneously by corresponding adjustment of the spray bar relative to, for example, the portioning belt, independently of the possible additional adjustability of the spray direction of each individual spray nozzle relative to the spray bar, as already mentioned.

Especially for the adjustability of the spray direction of the spray nozzles of the spray bar, the holding device, in addition to its main arm, preferably comprises a pivoting arm which is pivotable relative to the main part about a transverse axis extending in longitudinal direction relative to the longitudinal direction of the main arm and to the free end of which the spray bar is fastened, and which is fastened at its rear end adjustably, in particular in a desired pivot position to the main arm.

Since the spray bar can also be pivoted about its longitudinal direction and is adjustably fastened to this pivoting arm in such a design of the holding device, the entire spray bar can be adjusted in its position, e.g., the height distance, relative to the portioning belt by pivoting the pivoting arm, since as a rule the main arm is arranged to rise obliquely upwards from its fastening point on the base frame and to run in the passage direction and/or the pivoting arm is also positioned in this way in the assembled state.

In order to be able to change the distance of the spray bar from the fixing point of the holding device on the base frame, the holding device, in particular its main arm and/or its pivoting arm, is preferably designed to be variable in length, in particular telescopic. Thus, the main arm can consist of a base part that can be fastened to the base frame of the machine and a support part that is adjustable in relation to the base part, in particular in the longitudinal direction of the main arm, which is then also beam-shaped.

For further adjustability of the spray bar, the holding device, in particular its main arm, especially its base part, is also preferably attached to the base frame of the machine so as to be pivotable about a transverse axis running in the transverse direction.

In order to be able to manually reproduce the individual positionings, i.e., longitudinal position and/or pivoting position, a scale running in the respective longitudinal direction or pivoting direction is preferably arranged at the corresponding connection points on one of the two components movable relative to one another and a pointer pointing to the scale is arranged on the other of the two components movable relative to one another.

With regard to a construction kit for creating the described spray unit with a spray bar as well as a holding device therefor, such a construction kit comprises as construction kit parts, on the one hand, the holding device as well as the spray bar, and, on the other hand, at least one functional part which can be fastened to the spray bar.

The functional part can be at least one type of nozzle unit as a modular part, or also several types, for example a nozzle unit with only one nozzle as the 1st type and a nozzle unit with two nozzles as the 2nd type.

Further functional parts as modular parts can be at least one sort of a distribution box and/or at least one sort of a reservoir and/or in each case a mounting device therefor.

This simplifies the creation of corresponding spray units as an additional unit for a slicing machine, since the same holding device can always be used for this, provided that it is designed to be variable and stable enough with regard to its adjustability.

With regard to the method for operating a multi-track slicing machine, such as a slicer, with a spray unit, which comprises in particular a spray bar and a holding device supporting the latter, in particular a slicing machine according to one of the preceding claims, the existing problem is solved by the fact that, in the event of a change in the work order, the spray unit is also changed accordingly.

Thus, when changing the number of tracks, either the number of nozzle units attached to the spray bar can be changed or only the number of active nozzle units directed to one of the tracks can be changed, while the nozzle units not required are moved to a deactivated transverse position away from the tracks along the spray bar and parked there.

When the track distance is changed, the transverse distance of the nozzle units on the spray bar can be changed in the same way, so that in particular one nozzle unit is again directed at each track. Only in exceptional cases will several, e.g., two, nozzle units be fixed in close proximity to the spray bar and directed to the same track.

When changing the position or inclination of the portioning belt or changing the cross sections, in particular of all calibers to be sliced, the position of the entire spray bar can be changed in the passage direction and/or in height so that the nozzle units attached to it can apply the anticaking agent from the optimum distance to the desired application surface, be it the slice or the front surface of the caliber.

With regard to the setting of the spray nozzles on unit housings and/or the nozzle units on the spray bar and/or the spray bar on its holding device and/or the holding device on the base frame of the machine, the corresponding setting values are preferably documented and available so that they can be viewed and reproduced by an operator for the respective work order at any time. Preferably, these setting values are stored for this purpose in the control system and can be output to the operator at any time, in particular via the operating unit.

With regard to the mode of operation of the spray nozzles, these are preferably activated for spraying each individual slice already deposited only for a limited time in each case, i.e., the anticaking agent applied by them—with or without swirling by compressed air—is applied in a controlled manner intermittently and not permanently.

BRIEF DESCRIPTION OF THE DRAWINGS

Embodiments according to the invention are described in more detail below by way of example and with reference to the following drawings, which show.

DETAILED DESCRIPTION

Figure 1A:
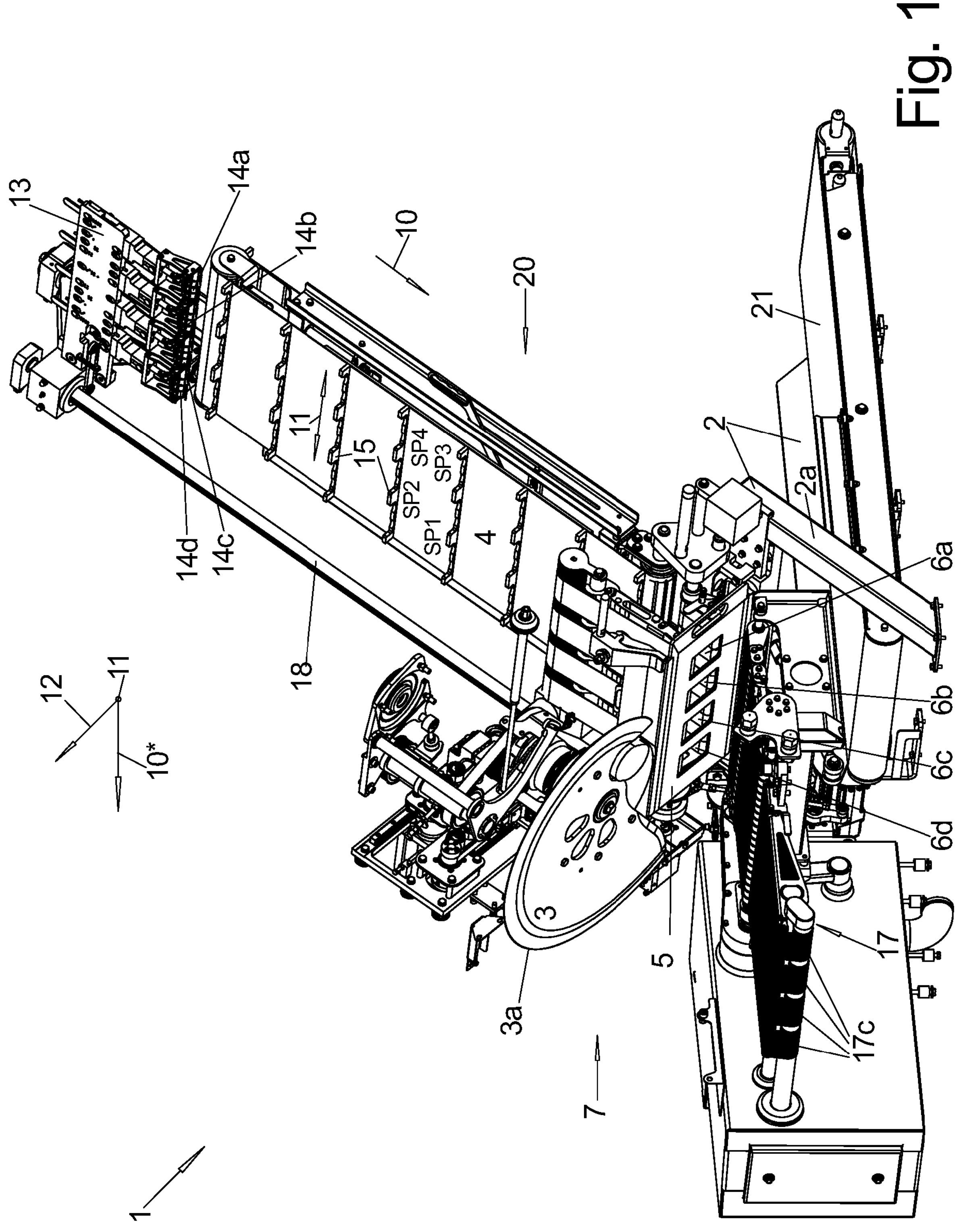
FIGS. 1*a, b*: a slicing machine in the form of a slicer according to the prior art in different perspective views, with the feed belt folded up into the slicing position.
Figure 1B:
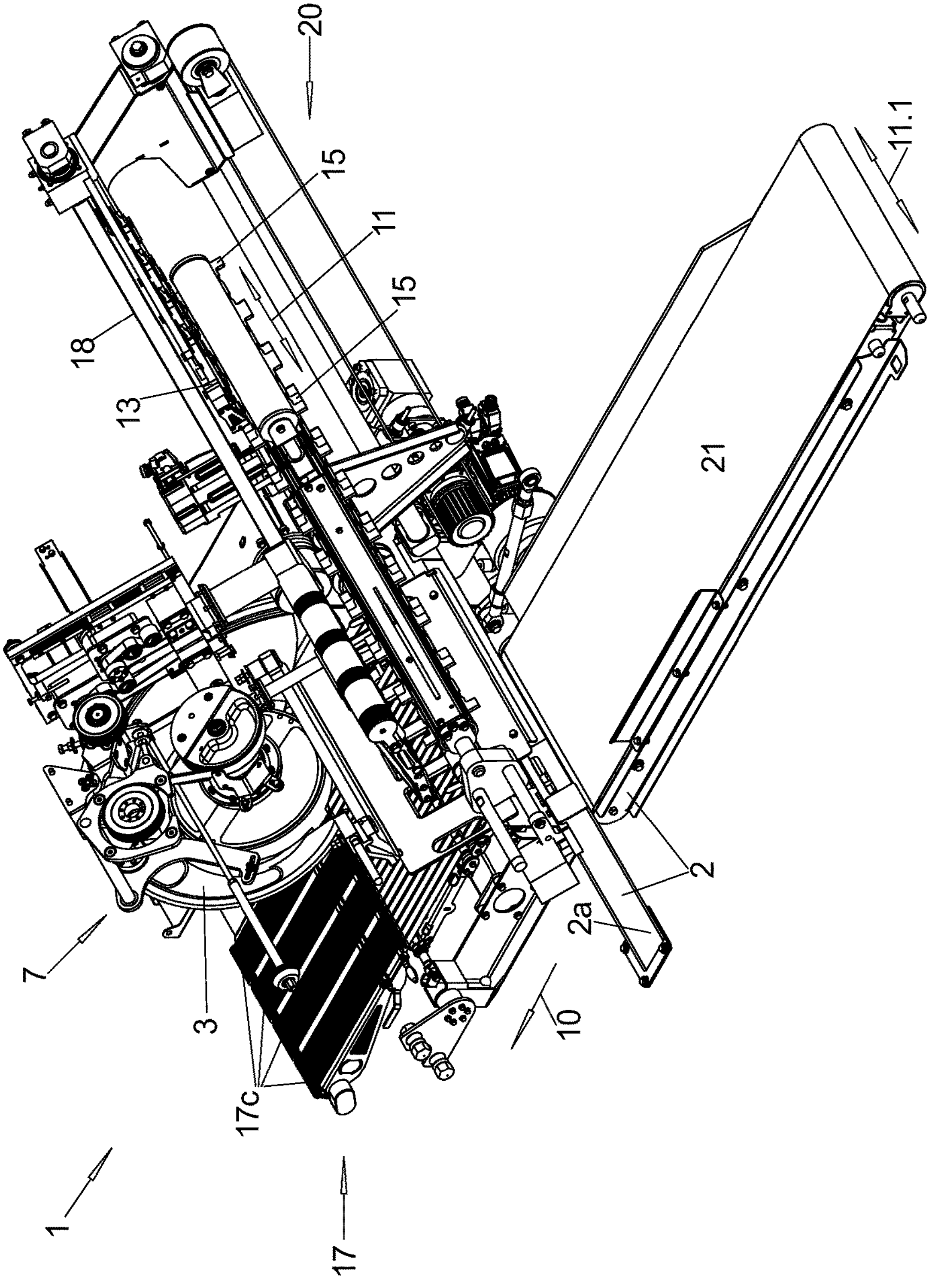
FIG. 1*c*: the slicing machine of FIGS. 1*a, b* in side view with the cover parts removed so that the various conveyor belts can be seen more clearly.

FIGS. 1*a*, 1*b* show different perspective views of a multi-track slicer 1 for simultaneous slicing of several product calibers K each on one track SP1 to SP4 next to each other and depositing in shingled portions P each consisting of several slices S with a general passage direction 10* through the slicer 1 from right to left.

Figure 1C:
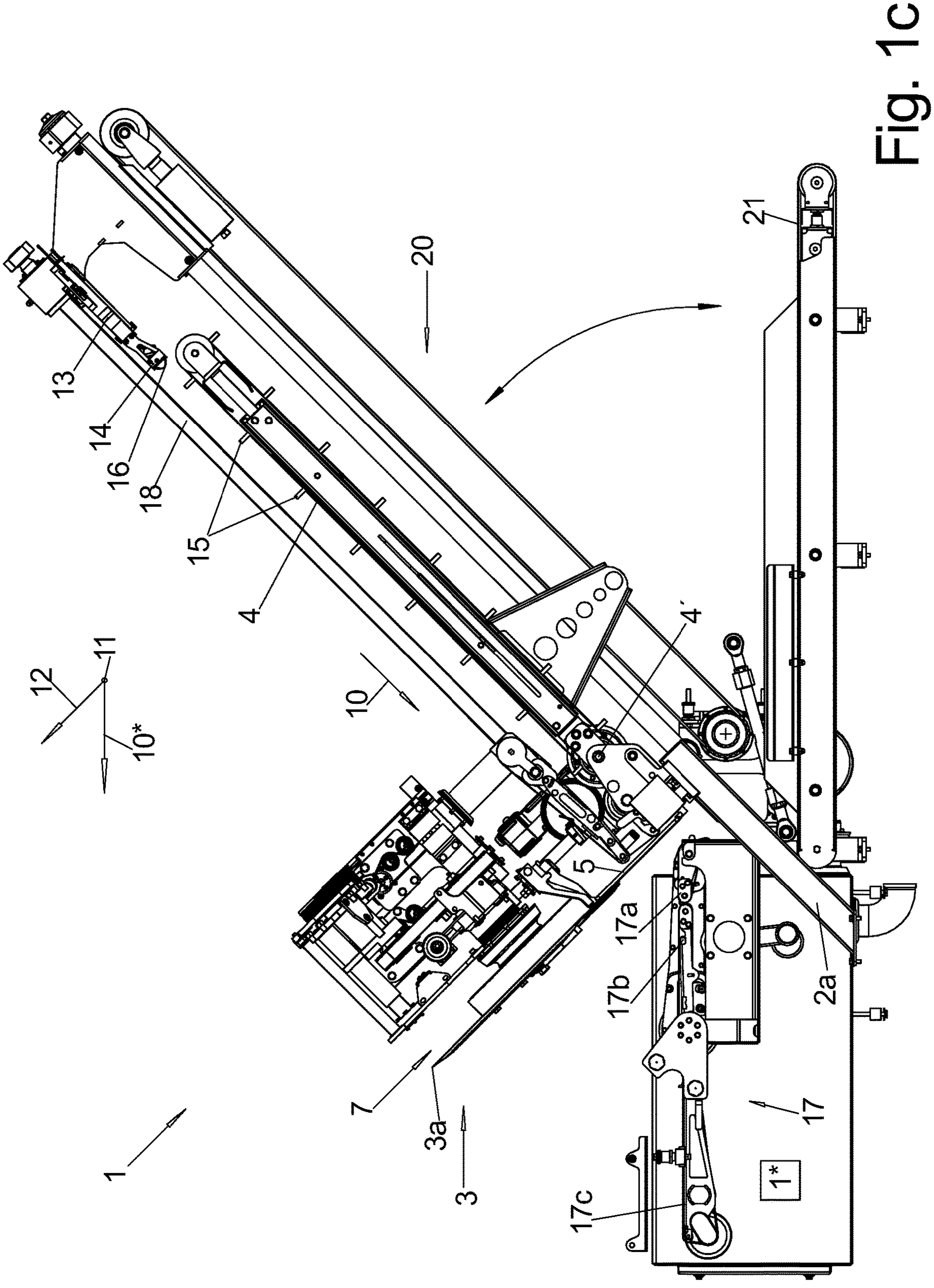
Figure 2A:
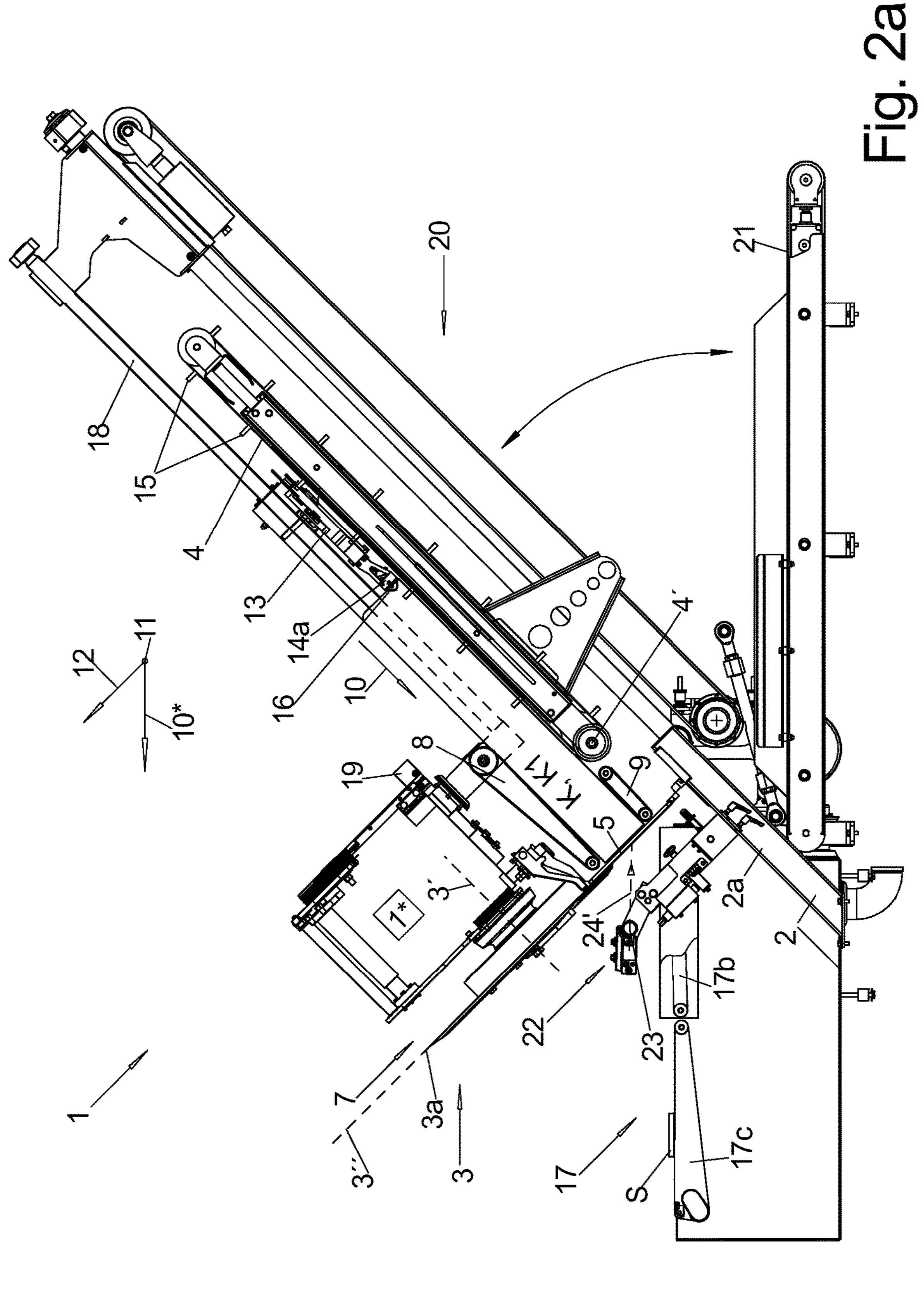
FIG. 2*a*: a, compared to FIG. 1*c*, simplified side view of the slicing machine, loaded with a product caliber and with an additional spray unit, which is in a first functional position.

FIG. 1*c* and FIG. 2*a* show—without and with inserted caliber K—a side view of this slicer 1 with omission of covers and other parts not relevant for the invention, which are fastened to the base frame 2 like all other units, so that the functional parts, above all the conveyor belts, can be seen better. The longitudinal direction 10 is the feed direction of the calibers K to the cutting unit 7 and thus also the longitudinal direction of the calibers K lying in the slicer 1.

It can be seen that the basic structure of a slicer 1 according to the state of the art is that to a cutting unit 7 with blades 3 rotating about a blade axis 3', such as a sickle blade 3, is provided with a plurality of, in this case four, product calibers K lying transversely to the feeding direction 10 next to one another on a feed conveyor 4 with spacers 15 of the feed conveyor 4 between them which are fed by this feed unit 20, and from the front ends of each of which the rotating blade 3 cuts off a slice S with its cutting edge 3*a* in one operation, i.e., almost simultaneously.

Figure 2B:
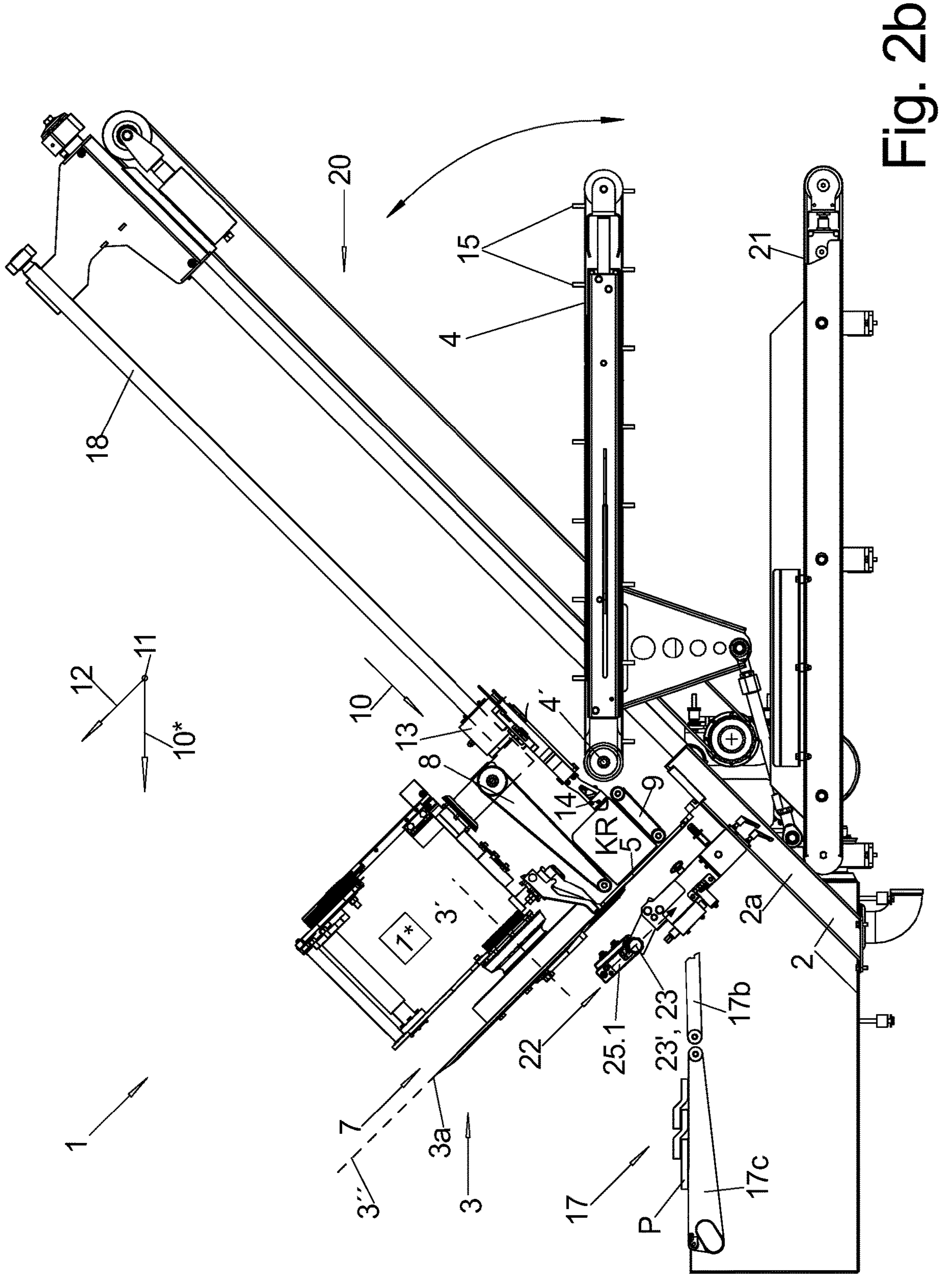
FIG. 2*b*: a side view as shown in FIG. 2*a*, but with the feed belt folded down to the loading position and the product caliber sliced except for an end piece of the caliber, with the additional spray unit located in a second functional position.

For cutting the product calibers K, the feed conveyor 4 is in the cutting position shown in FIGS. 1*a*-2*a*, which is oblique in side view with a low-lying front end on the cutting side and a high-lying rear end, from which it can be folded down about a pivot axis 4' running in its width direction, the first transverse direction 11, which is located in the vicinity of the cutting unit 7, into an approximately horizontal loading position as shown in FIG. 2*b*.

The rear end of each caliber K lying in the feed unit 20 is held positively by a gripper 14*a-d* with the aid of gripper claws 16 as shown in FIG. 2*a*. These grippers 14*a*-14*d*, which can be activated and deactivated with respect to the position of the gripper claws 16, are attached to a common gripper slide 13, which can be moved along a gripper guide 18 in the feed direction 10.

Both the feed of the gripper slide 13 and of the feed conveyor 4 can be driven in a controlled manner, but the actual feed speed of the calibers K is effected by a so-called upper and lower product guide 8, 9, which are also driven in a controlled manner and engage on the upper side and lower side of the calibers K to be sliced in their front end sections near the cutting unit 7.

The front ends of the calibers K are guided in each case through a so-called product opening 6*a-d* of a plate-shaped cutting frame 5, the cutting plane 3'' running directly in front of the front, obliquely downward-pointing end face of the cutting frame 5, in which cutting plane the blade 3 rotates with its cutting edge 3*a* and thus cuts off the protrusion of the calibers K from the cutting frame 5 as a slice S. The cutting plane 3'' runs directly in front of the front, obliquely downward-pointing end face of the cutting frame 5. The cutting plane 3" runs perpendicular to the upper run of the feed conveyor 4 and/or is spanned by the two transverse directions 11, 12 to the feed direction 10.

The inner circumference of the product openings 6*a-d* serves as a counter cutting edge of the cutting edge 3*a* of the blade 3.

Since both product guides 8, 9 can be driven in a controlled manner, in particular independently of one another and/or possibly separately for each track SP1 to SP4, they determine the—continuous or clocked—feed speed of the calibers K through the cutting frame 5.

The upper product guide 8 is displaceable in the second transverse direction 12—which is perpendicular to the surface of the upper run of the feed conveyor 4—for adaptation to the height H of the caliber K in this direction. Furthermore, at least one of the product guides 8, 9 can be designed to be pivotable about one of its deflecting rollers in order to be able to change the direction of the run of its guide belt resting against the caliber K to a limited extent.

Below the feed conveyor unit 20 there is usually an approximately horizontal end piece conveyor 21, which starts with its front end below the cutting frame 5 and directly below or behind the discharge conveyor unit 17 and with its upper run thereon—by means of the drive of one of the discharge conveyors 17 against the passage direction 10—transports falling end pieces to the rear.

The slices S standing obliquely in the space at the time of separation fall onto a discharge unit 17 starting below the cutting frame 5 and running in the passage direction 10*, which in this case consists of several discharge conveyors 17*a, b, c* arranged one behind the other with their upper runs approximately in alignment in the passage direction 10*, of which the first discharge conveyor 17*a* in the passage direction 10 can be designed as a portioning belt 17*a* and/or one can also be designed as a weighing unit.

The slices S can strike the discharge conveyor 17 individually and at a distance from one another in the passage direction 10* or, by appropriate control of the portioning belt 17*a* of the discharge conveyor 17—the movement of which, like almost all moving parts, is controlled by the control 1*—can form shingled or stacked portions P by stepwise forward movement of the portioning belt 17*a*.

Figure 4A:
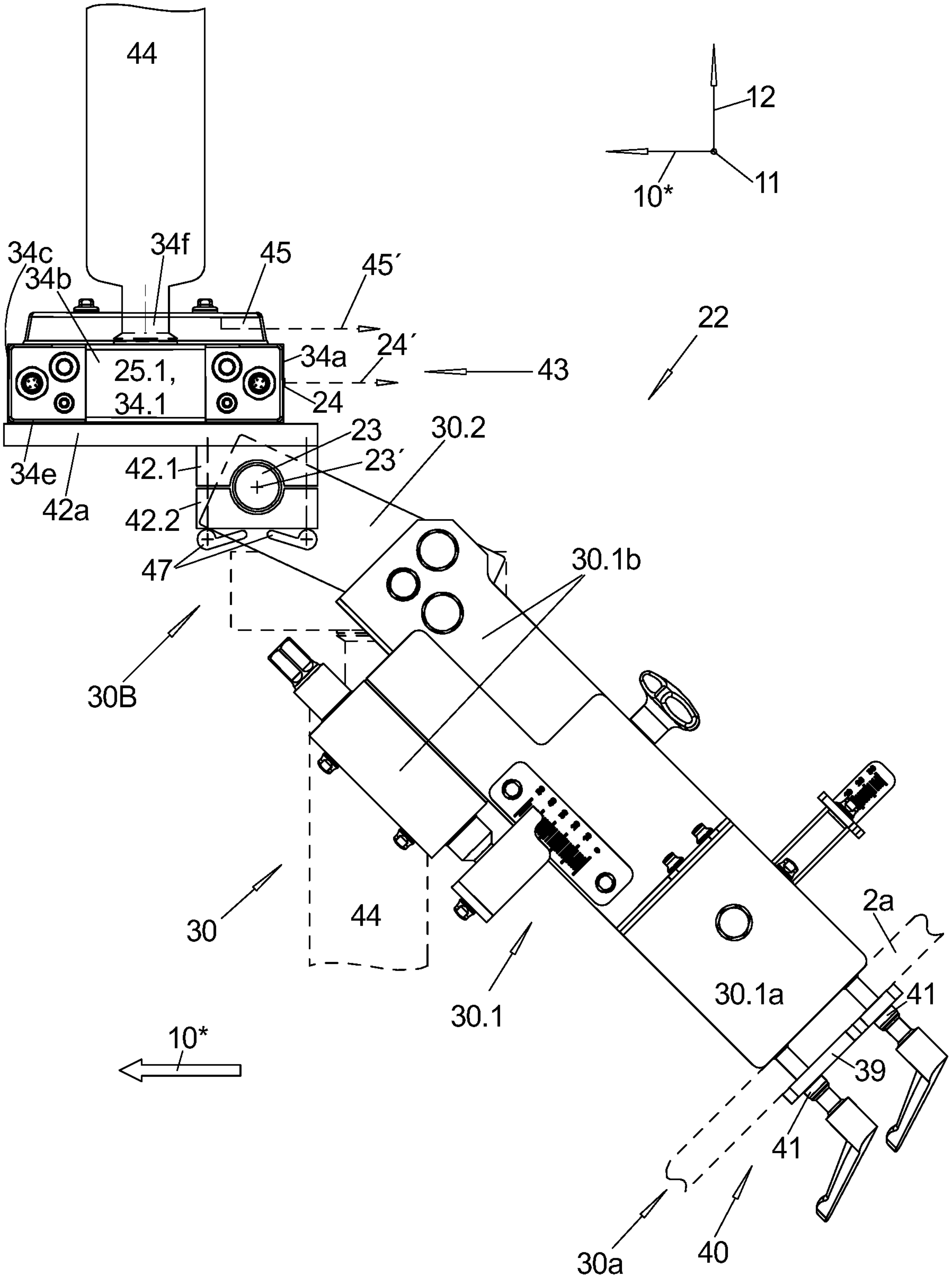
Figure 4B:
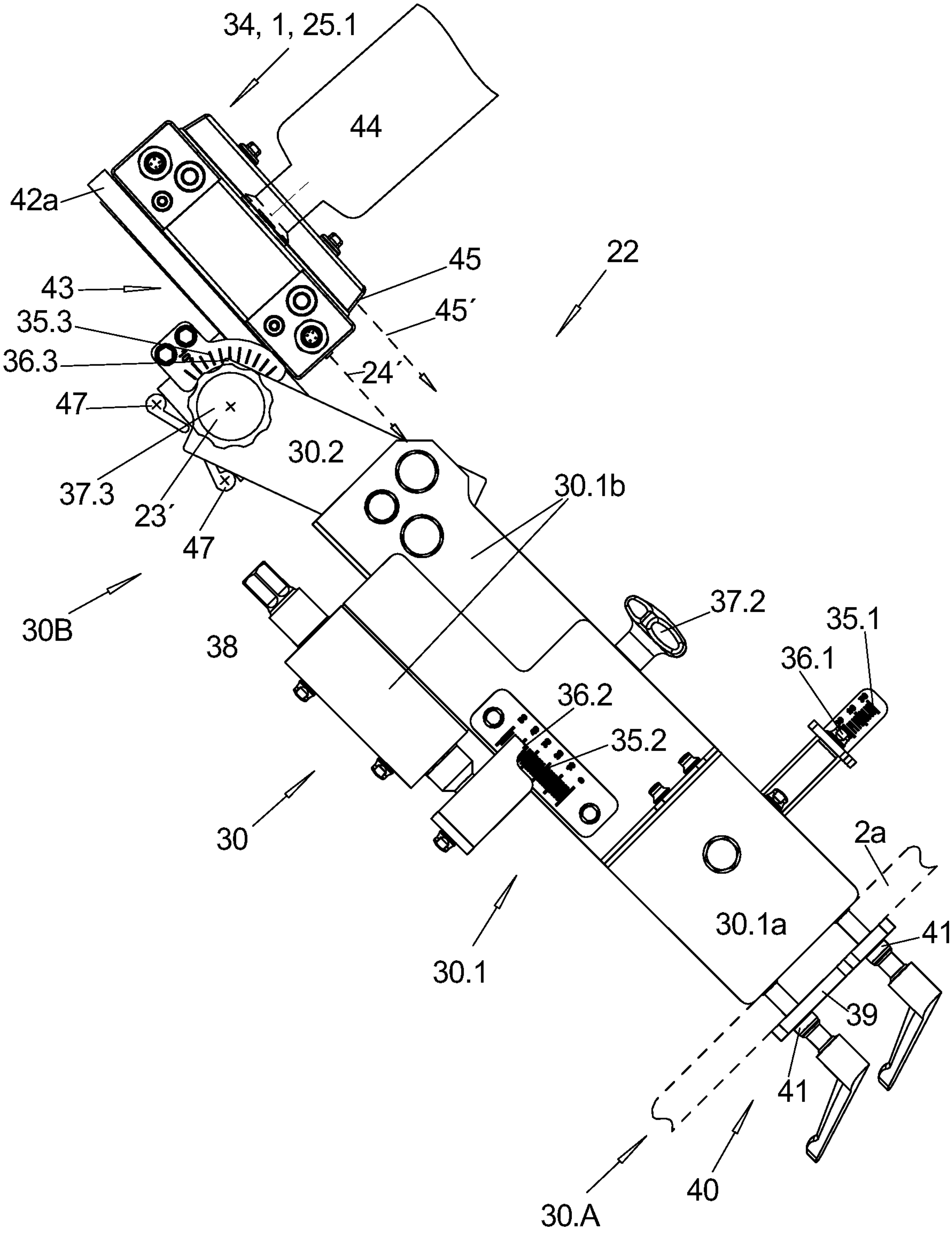

In the two side views of FIGS. 2*a* and 2*b*, compared with FIGS. 1*a-c*, a spray unit 22 for applying an anticaking agent T to the slices S is additionally drawn, in FIG. 2*a* in the functional position according to the enlarged individual representation of FIG. 4*a* and in FIG. 2*b* in the functional position according to the enlarged representation of FIG. 4*b*.

In FIG. 2*a*, the spray bar 23 of the spray unit 22 extending in the transverse direction 11 is in such a pivoted position about the transverse direction 11—which is also the longitudinal extension 23' of the spray bar 23—that the nozzle units 25.1 mounted on the right narrow side of the spray bar 23 in FIG. 2*a* with the spray direction 24' of their spray nozzles 24 pointing approximately horizontally rearwards against the passage direction 10* and are directed towards the end face of the caliber K or K1 projecting from the cutting frame 5, which end face is sprayed with anticaking agent T before being cut off as a slice S by the blade 3.

In FIG. 2*b*, on the other hand, the spray bar 23 is rotated about its longitudinal direction 23' in such a way that the spray direction 24' points obliquely downwards to the rear and thus to the upper side of the last slice S already deposited on the portioning belt 17*a* (shown only in FIG. 2*a*), which is wetted with the anticaking agent T when the spray nozzle 24 is activated.

The fine adjustment is made by adjusting the individual spray nozzle units 25.1-25.4 relative to the spray bar 23.

Figure 3:
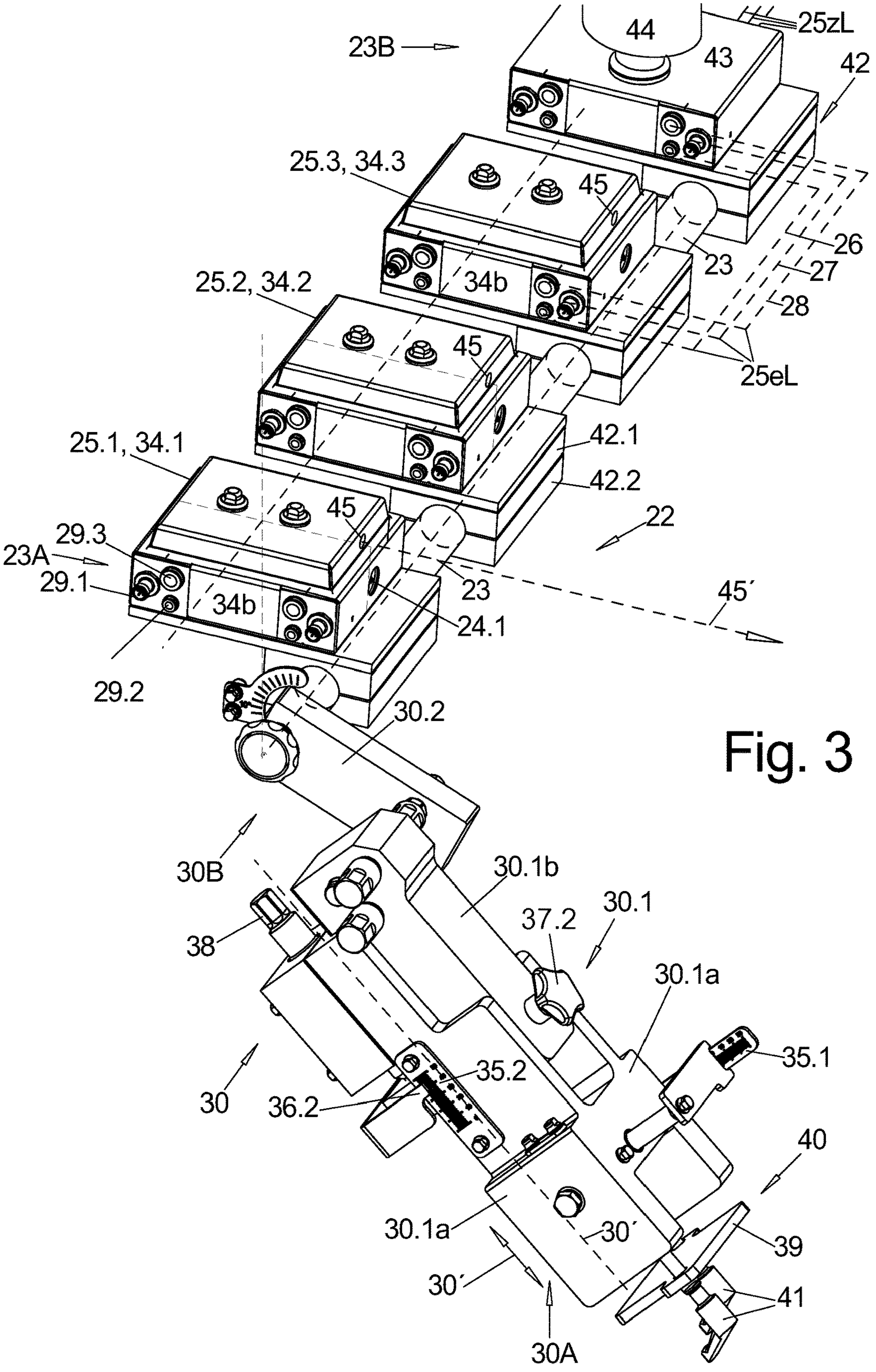
FIG. 3: the spray unit alone in a perspective view, FIGS. 4*a, b*: the spray unit of FIG. 3 in side view with the spray bar in different functional positions analogous to FIGS. 2*a, b,*

As can be seen more clearly from the perspective view in FIG. 3 and the side views in FIGS. 4*a, b* of the spray unit 22 alone, the spray unit 22 consists on the one hand of the spray bar 23, to which the nozzle units 25.1-25.4 are attached by the respective unit housing 34.1-34.4 and the respective spray nozzle 24.1 to 24.2—of which, for reasons of space, only the first three of the four are shown in FIG. 3—are arranged in its peripheral wall 34*a* facing away from the passage direction 10*, i.e., towards the rear, and, on the other hand, a holding device 30 with which the spray bar 23 can be secured relative to the base frame 2 of the machine 1.

Figure 5:
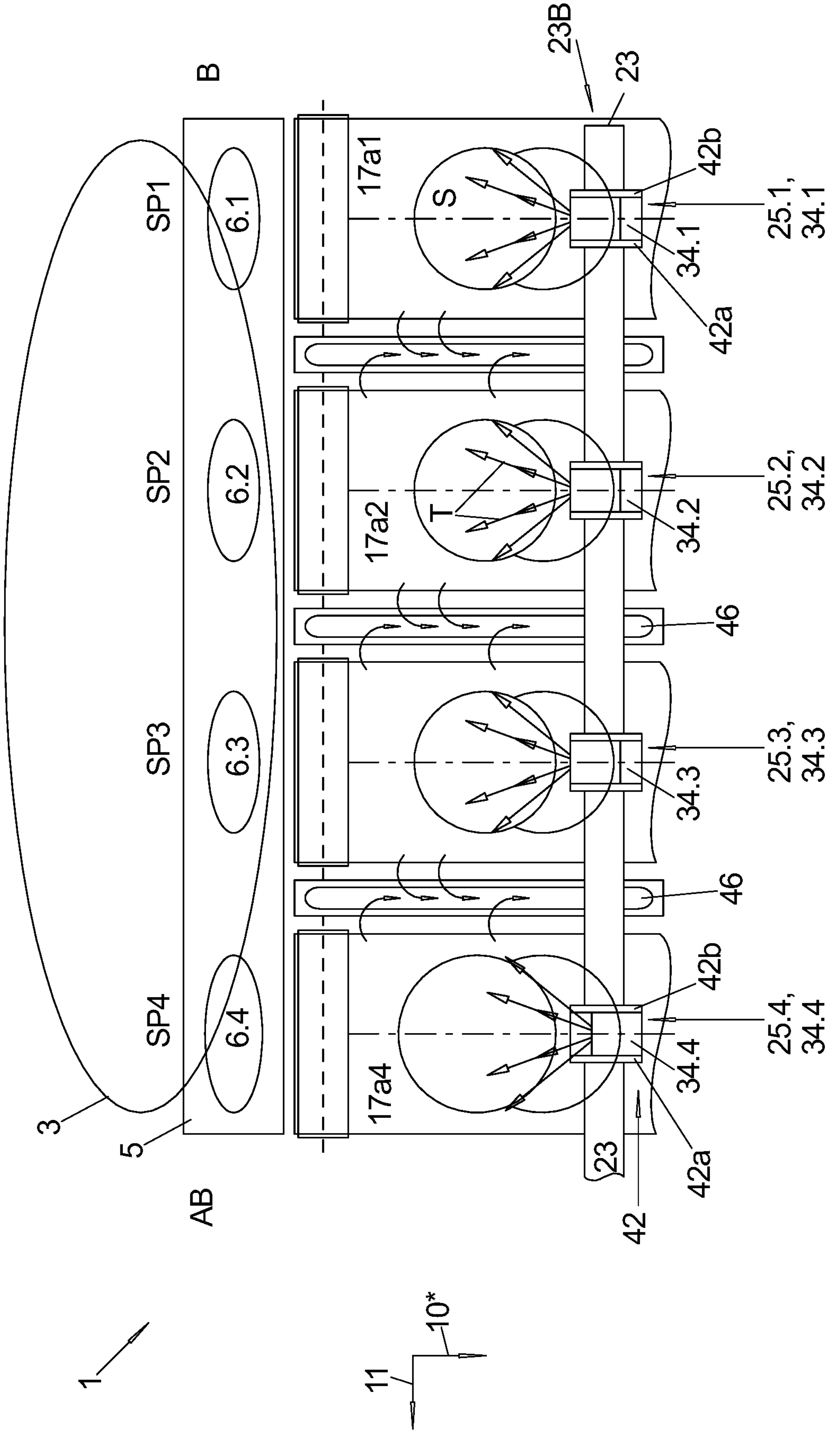
FIG. 5: a top view of a part of the multi-track slicing machine with the spray bar of the spray unit as shown in FIG. 3 and FIG. 4*a, b,*

As FIG. 5 shows in a sectional view of a—in this case again completely four-track—slicer 1, the spray bar 23 extends substantially over all tracks SP1 to SP4 of the slicer 1, and the spray units 25.1-25.4 are displaceable and fixable in transverse direction 11 along the, for example, tubular spray bar 23 by means of the fixing devices 42 which are better visible in FIG. 3.

FIG. 5 further shows that on track SP4 a—not shown—caliber with a round cross section is sliced, which is larger than the round cross sections of the calibers on tracks SP1 to SP3 and accordingly also the cross sections 6.1-6.3 in the cutting frame 5 are smaller than the cross section 6.4 and likewise the slices S cut off.

Adapted to this, the unit housings 34.1-34.3 of the nozzle units 25.1-25.3 are moved along the respective guides 42*a*, 42*b* of their respective fastening devices 42 closer to the slices S to be wetted, which are deposited on the portioning belts 17*a*1 to 17*a*3, so that the anticaking agent T wets as far as possible only the surface of the, in particular last, deposited slice S, but no areas away from it.

In contrast, on the track SP 4 the nozzle unit 25.4 with its unit housing 34.4 is moved further away from the portioning belt 17*a*4, i.e., along the guides 42*a, b* away from it, downwards in FIG. 5.

In FIGS. 2*a, b*, the holding device 30 is attached to the cross-member 2*a* of the base frame 2, which rises obliquely from the front to the rear and is present in the view at least on the operator side facing the operator, as FIG. 1*a* shows.

The holding device 30 is thus fastened to the base frame 2 with its rear end section 30A in the passage direction 10* and carries on its other end section 30B, which is located further forward and further up in the assembled state, the spray bar 23, which is fastened to the end section 30B of the holding device 30 in a cantilevered manner on one side, namely with its end section 23A, and from there extends with its longitudinal direction 23' in the transverse direction 11, preferably over all tracks SP1 to SP4 of the slicing machine 1.

As best shown in FIG. 3, the spray bar 23 in this case is a tube 23 with a round cross section, to which the several—in this case three—nozzle units 25.1-25.3 shown are fastened distributed in transverse direction 11 by means of a mounting device 42, which comprises a clamp 42 consisting of two half shells 42.1, 42.2 for clamping to the pipe 23 of the spray bar 23, which can be clamped against each other and thus against the spray bar 23 by means of known quick release fasteners 47 (see FIG. 4*a*) or can be released, in order to displace the mounting device 42 either in transverse direction 11 along the pipe 23 or to pivot about the longitudinal direction 23' of the spray bar 23 and thereby change the spray direction 24' of the at least one spray nozzle 24 of the nozzle unit 25.1 held by the mounting device 42.

The mounting device 42 further comprises guides 42*a, b* (see FIG. 5) on one, here the upper, half shell 42.1 of the clamps 42, which run parallel to one another and transversely to the longitudinal direction 23' of the spray bar 23, and along which the respective nozzle unit, e.g., 25.1, in particular its unit housing 34, can be displaced and fixed—by means of a further mounting device not shown, A unit housing 34 is usually cube-shaped with, in this case, a trough-shaped lower part with four peripheral walls 34*a*-34*d* adjoining one another in circumferential direction and a bottom 34*e*, which enclose a rectangular cross section, and the substantially open upper side of which can be tightly closed by a cover 34*f*.

A pointing device 45, which emits a visible light beam 45' in, in particular, the same direction as the spray direction 24' of the spray nozzle 24, is also present in this, preferably in each, nozzle unit 25.1, in this case in the cap-shaped cover 34*f*. This makes it easier for the user to align the nozzle unit 25.1 with the impingement surface on, for example, a slice S.

Figure 6A:
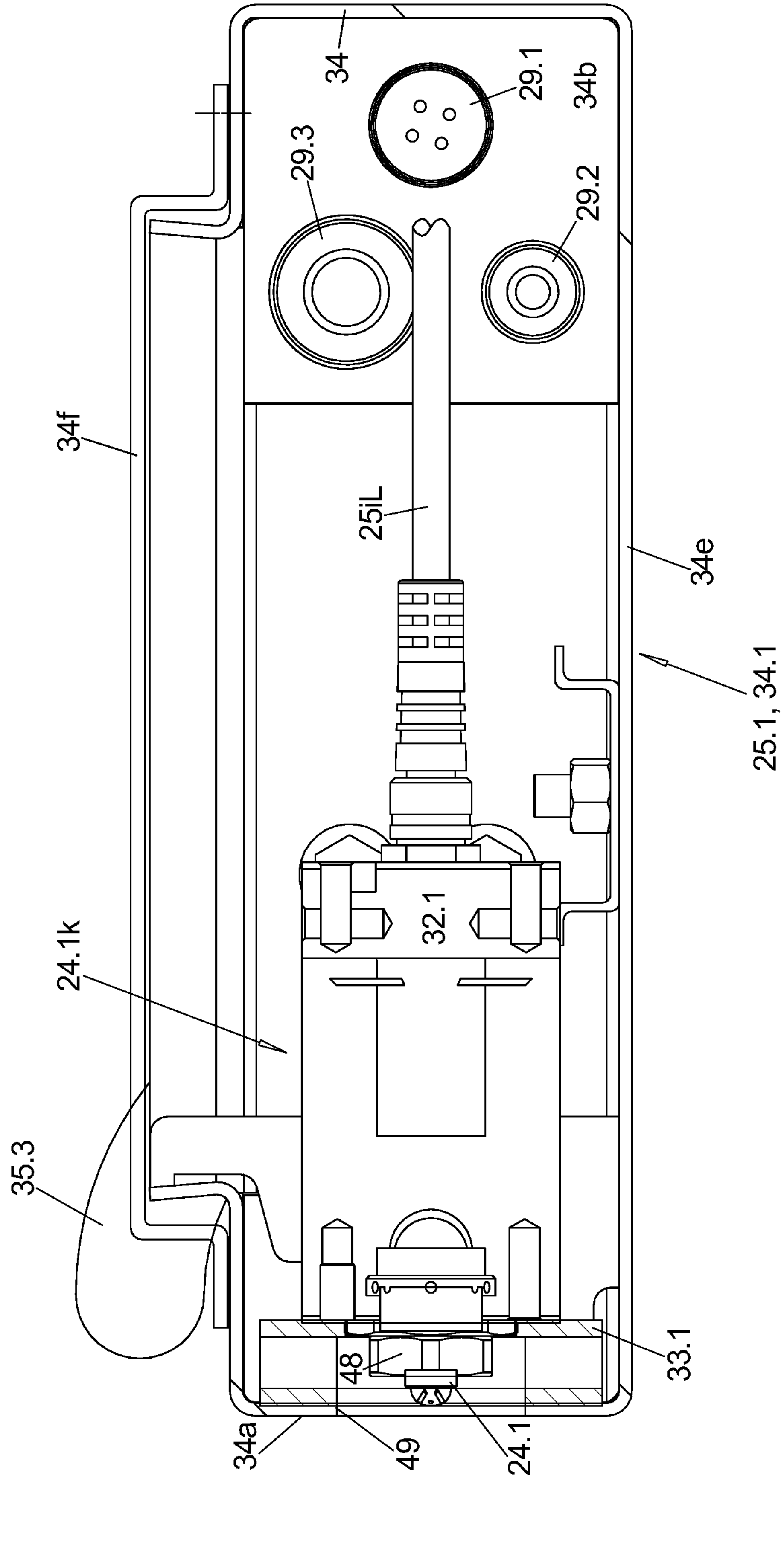
FIG. 6*a*: a spray unit in sectional view cut along the line A-A of FIG. 3, FIG. 6*b*: a detailed perspective view of an installed spray nozzle.
Figure 6B:
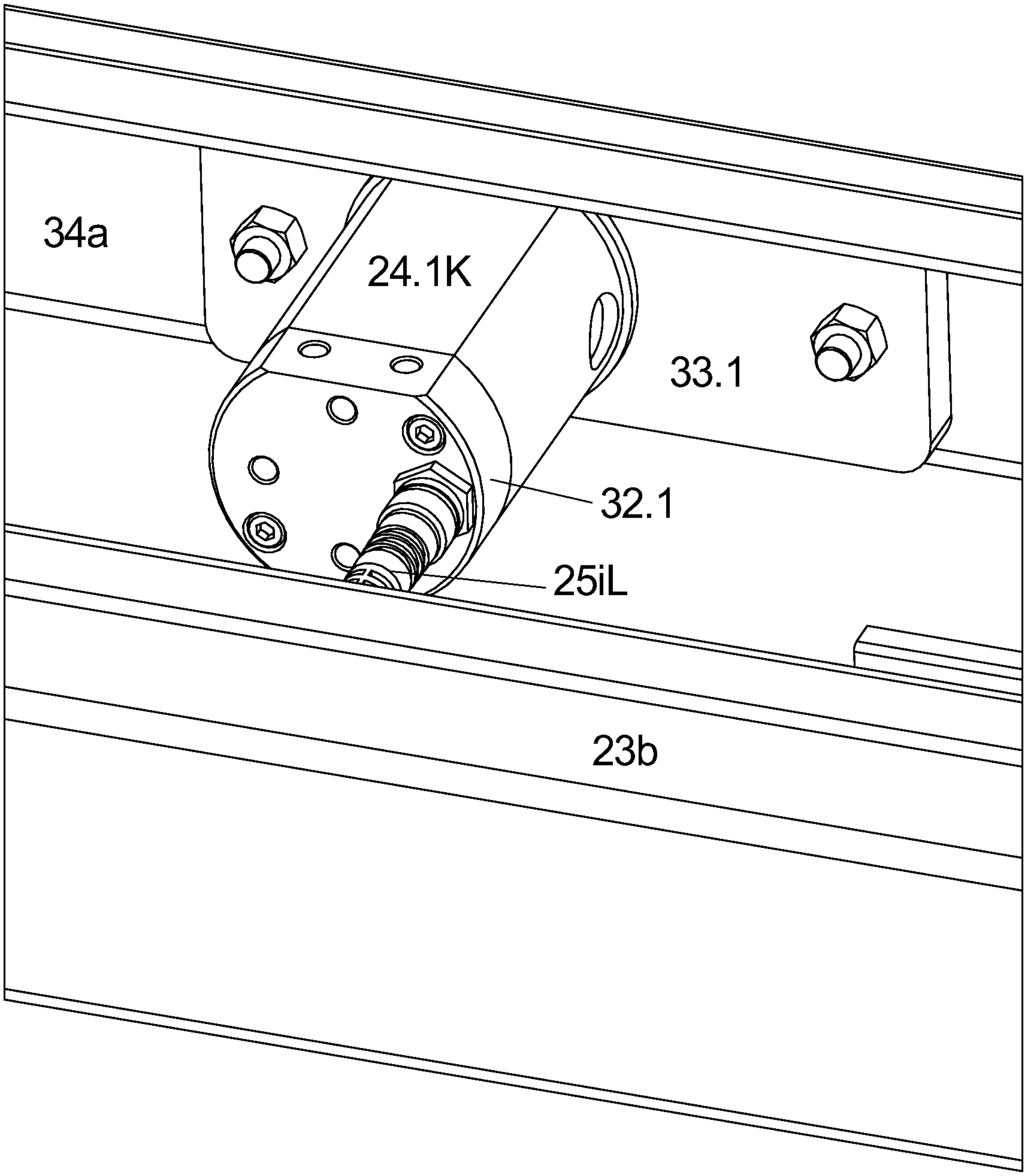

In the peripheral wall 34*a*, which in the assembled state is directed against the passage direction 10*, the spray nozzle, e.g., 24.1, which is located at the front end of a nozzle body 24.1*k*, whose approximately cylindrical part extends from the passage into the interior of the unit housing 34 and which at its rear end is directly integrated with a shut-off valve 32.1 for the supplied anticaking agent 25 and/or the compressed air used for atomization, as can best be seen in FIG. 6*a*.

In the peripheral wall 34*a* several, e.g., two, spray nozzles can also be arranged next to each other or one above the other.

At each nozzle unit, e.g., 24.1*k* several internal supply lines 25*i*L open out, of which in this case for clarity reasons only one is drawn in FIG. 6*a*, which in this case runs from the corresponding contact 29.1-29.3 in the peripheral wall, e.g., 34*b* of the unit housing 34.1 for a corresponding external supply line 25*e*L (see FIG. 3) to the nozzle unit 24.1*k*.

The internal supply line 25*i*L shown here is an electric cable, via which on the one hand the power supply to the shut-off valve 32.1 and on the other hand the electric control signals to the shut-off valve are led, while the internal supply lines for anticaking agent T and compressed air are not shown, one of which must also end at each of the spray nozzles, e.g., 24.1.

From the contacts 29.1-29.3 in the peripheral wall, e.g., 34*b* of the unit housing 34.1 runs—as indicated in FIG. 3—in each case a corresponding external supply line 25*e*L to a distribution box 43, which is supplied via respective central supply lines 25*z*L with the respective media—e.g., compressed air 26, electrical signals 27, electrical current 28—and in which the splitting into the external supply lines 25*e*L to the individual nozzle units 25.1-25.3 takes place.

The distribution box 43 is also attached to the spray bar 23, preferably displaceably attached in its longitudinal direction 23' by means of an identical mounting device 42 as the nozzle units 25.1, 25.2 etc.

Preferably, the one or more reservoirs 44 for the wetting agent, in particular anticaking agent T, are also attached directly to the distribution box 43, for example in the form of a bottle 44 which can be screwed thereto by means of the thread on its neck and can be replaced.

In the operating state, this bottle 44 is upside down with the neck pointing downwards. To replace a bottle 44, the distributor box 43 with the thread for attaching the bottle 44 is rotated about the longitudinal direction 23' as shown in FIGS. 4*a, b*, to such an extent that the bottle 44—shown dashed—can be replaced without difficulty.

Preferably, the spray nozzle 24.1 can be changed by being operatively connected in a rotationally fixed manner to a hexagon nut 48, which can be loosened by inserting a hexagon nut from the outside into the passage 49 and removed together with the spray nozzle 24.1 and exchanged for another one.

The nozzle body 24.1*k*, at the front end of which the spray nozzle 24.1 is seated, remains screwed with its front side to the rear side of an intermediate plate 33.1 which, according to FIG. 6*a*, is screwed to the inner side of the peripheral wall 34*a* at a distance from the latter in such a way that the periphery of the passage opening 49 remains tightly closed.

The rear end of the approximately cylindrical nozzle body 24.1*k*, which projects into the interior of the spray bar 23, is additionally screwed to the lower peripheral wall 34*e* of the unit housing 34 by means of a multiple-grooved profile, as best shown in FIG. 6*a*.

According to FIG. 3, the holding device 30 has in its rear end section 30A a clamping device 40 comprising a press plate 39 which can be pressed by means of several tensioning nuts 41 in the direction towards the rear end face of the beam-shaped holding device 30 and can thus be non-positively fastened to approximately the cross-member 2*a*. For this purpose, the clamping nuts 41, which in this case have corresponding handles, are screwed onto the free end of threaded bolts projecting from this rear end face and passing through the press plate 39.

In order that the spray bar 23, which is held at the other, front end section 30B, can be positioned very variably with respect to position and rotational position about the transverse direction 11, which in the assembled state is usually identical to the longitudinal direction 23' of the spray bar 23, the holding device consists of a main arm 30.1, the rear end of which can be fixed to the base frame by means of the clamping device 40, and a pivoting arm 30.2, which is fastened thereto so as to be pivotable about a pivot axis extending in the transverse direction 11 and to which the spray bar 23 can be pivoted approximately by one of its end faces, preferably the end face in which the contacts 29.1 to 29.3 (see FIG. 3) are located, and this again so as to be pivotable about a pivot axis extending in the transverse direction 11.

In order to be able to reproduce this latter pivoting position, an arc-shaped scale 35.3, shown only in FIG. 4*b*, is attached to the end face of the spray bar 23, and a pointer 36.3, which points to one of the markings of the scale 35.3, is attached to the pivoting arm 30.2.

The corresponding pivoting position between pivoting arm 30.2 and spray bar 23 is fixed by tightening a handwheel 37.3, with which the spray bar 23 can be clamped in the set pivoting position relative to pivoting arm 30.2.

Irrespective of the presence of the pivoting arm 30.2, the supporting device 30, in particular its main arm 30.1, can consist in the longitudinal direction 30'—the greatest direction of extension—of the bar-shaped holding device 30 of two parts which can be displaced relative to one another and thus telescoped, in this case a base part 30.1*a*, on which the clamping device 40 for fixing to the base frame 2 is located, and a support part 30.1*b*, on which either the pivoting arm 30.2 or directly the spray bar 23 is fixed.

The amount of the extension is again indicated by means of a scale 35.2 and a pointer 36.2 referring to it, one of which is fixed to the base part 30.1*a* and the other to the support part 30.1*b*. The set pressure position is again fixed by means of a handwheel 37.2, by means of which a clamping screw is actuated which is non-rotatably connected thereto and which clamps the two parts against each other.

In the released state of this clamping device, the relative longitudinal movement from base part 30.1*a* to support part 30.1*b* can be effected by means of a threaded spindle whose drive journal 38 in the form of an external hexagon in this case projects from the upper end surface of the main part 30.1*a*.

In addition, an adjustment of the holding device 30, in this case of the main arm 30.1, in particular of its base part 30.1*a*, can be made relative to the clamping device 40 in the transverse direction to the longitudinal direction 30' of the holding device or 30.1' of its main part 30.1, the adjustment direction of which is also transverse to the transverse direction 11, the longitudinal direction 23' of the spray bar 23.

Also there, for indicating the transverse adjustment, a scale 35.1 as well as a pointer 36.1 directed thereon are provided, one of which is fixed to the clamping device 40 and the other to the holding device 30, in particular its main part 30.1.

LIST OF REFERENCES

1 slicing machine, slicer
1* control
2 base frame
3 blade
3 rotation axis
3" blade plane, cutting plane
3*a* cutting edge
4 feed conveyor, feed belt
5 cutting frame
6*a-d* product opening
7 cutting unit
8 upper product guide, upper guide belt
8.1 contact run, lower run
8*a* cutting side deflecting roller
8*b* deflecting roller facing away from the cutting side
9 bottom product guide, lower guide belt
8.1 contact run, upper run
9*a* cutting side deflecting roller
9*b* deflecting roller facing away from the cutting side
10 transport direction, longitudinal direction, axial direction
10* passage direction through machine
11 $1^{st}$ transverse direction (width slicer)
12 $2^{nd}$ transverse direction (height-direction caliber)
13 gripper unit, gripper slide
14,14*a-d* gripper
15 spacer
16 gripper claw
17 discharge conveyor unit
17*a, b, c* discharge conveyor
17*a* portioning belt
18 gripper guide
19 height sensor
20 feed unit
21 end piece conveyor
22 spray unit
23 spray bar
23A, B end section
23' longitudinal direction
23" nozzle plane
24.1, 24.2 spray nozzle
24.1*k*, 24.2*k* nozzle body
24' spray direction
25.1, 25.2 nozzle unit
25*e*L external supply line,
25*i*L internal supply line,
26 compressed air
27 electrical signals
28 electric current
29.1-29.3 contact
30 holding device
30A, B end section
30' longitudinal direction
30.1 main arm
30.1*a* base part
30.1*b* support part
30.2 tilting arm
31' transverse axis
32.1, 32.2 locking valve
33.1, 33.2 intermediate plate
34 unit housing
34*a, b, c, d* peripheral wall, wall
34*e* bottom
34*f* cover
35.1, 35.2 scale
36.1, 36.2 pointer
37 handwheel, clamping screw
38 drive journal
39 press plate
40 clamping device
41 tensioning nut
42 mounting device, clamp
42.1, 42.2 half shell
42*a, b* guide
43 distribution box
44 reservoir
45 pointer device
46 suction device
47 quick release fastener
48 hexagon nut
49 passage
K product, product caliber
KR end piece
S slice
T anticaking agent
P portion

The invention claimed is:

1. A multi-track slicing machine for slicing calibers into slices and producing shingled or stacked portions from the slices, the slicing machine comprising:

a cutting unit, a feed unit for feeding at least one caliber to the cutting unit, a discharge conveyor unit with at least one portioning belt for discharging the portions in a passage direction of the slicing machine, and a spray unit including a plurality of nozzle units, wherein each nozzle unit comprises at least one spray nozzle for applying a liquid or powdery anticaking agent to a slice, wherein the spray unit comprises a holding device, and a spray bar fastened to the holding device and extending in a horizontal transverse direction to the passage direction across all tracks of the slicing machine, and wherein the nozzle units are arranged independently of one another adjustably on the spray bar, each of the nozzle units has a hollow unit housing, and for each nozzle unit, the at least one spray nozzle is arranged in a passage of a peripheral wall of the unit housing, wherein the spray bar is pivotable with respect to an axis that extends in the transverse direction to adjust a spray direction of the nozzle units, wherein the holding device comprises:

a main arm having a longitudinal direction, a pivoting arm which is pivotable relative to the main arm about a transverse axis that extends transverse to the longitudinal direction and to which the spray bar is attached, and wherein the slicing machine further comprises a base frame, wherein the main arm of the holding device comprises a base part which is fastenable to the base frame and a support part which is telescopically adjustable in relation to the base part in the longitudinal direction.

2. The slicing machine according to claim 1, wherein the nozzle units are designed to be adjustable and fixable independently of one another relative to the spray bar by means of a mounting device in the transverse direction and/or transversely to the transverse direction, and/or with respect to their spray direction.

3. The slicing machine according to claim 2, wherein each nozzle unit is designed to be adjustable and fixable transversely to a longitudinal direction of the spray bar.

4. The slicing machine according to claim 1, wherein a distribution box for distributing media to be supplied to the individual spray nozzles is fastened to the spray bar, wherein the media comprise the liquid or the powdery anticaking agent, and the distribution box is adjustable and fixable with respect to the spray bar in a longitudinal direction of the spray bar.

5. The slicing machine according to claim 4, wherein the spray unit comprises a supply line for each medium to be supplied to the spray nozzles, and the distribution box has only one contact for each supply line.

6. The slicing machine according to claim 5, wherein the media include at least one of anticaking agent, compressed air, electrical signals, or electrical current.

7. The slicing machine according to claim 5, wherein the media include at least one of anticaking agent and compressed air, and the spray unit comprises, for each medium to be supplied, a switchable shut-off valve in the distribution box or in the unit housing of each nozzle unit.

8. The slicing machine according to claim 1, wherein the spray unit comprises a reservoir for the anticaking agent, wherein the reservoir is connected to the spray bar and the reservoir is adjustable and fixable in a longitudinal direction of the spray bar and/or pivotable and fixable about the longitudinal direction of the spray bar.

9. The slicing machine according to claim 1, wherein the spray bar is fastened to the holding device only at one point along a longitudinal direction of the spray bar.

10. The slicing machine according to claim 1, wherein each nozzle unit has at least one non-contact pointing device for pointing out a spray direction of the at least one spray nozzle.

11. The slicing machine according to claim 1, wherein each nozzle unit comprises a mountable and demountable cover for closing a longitudinal side of the unit housing, and an intermediate plate positioned in the unit housing and fastened to the unit housing, and for each nozzle unit, each of the at least one spray nozzle is attached to the intermediate plate.

12. The slicing machine according to claim 11, wherein, for each nozzle unit, the intermediate plate is screwed to a wall of the unit housing from an inside of the unit housing, and each of the at least one spray nozzle is screwed to the intermediate plate.

13. The slicing machine according to claim 1, wherein the holding device is beam-shaped with a longitudinal direction, and the spray bar is adjustable relative to the holding device along the longitudinal direction.

14. The slicing machine according to claim 1, wherein each nozzle unit comprises at least one laser pointer for pointing out a spray direction of the at least one spray nozzle.

15. A multi-track slicing machine for slicing calibers into slices and producing shingled or stacked portions from the slices, the slicing machine comprising:

a cutting unit, a feed unit for feeding at least one caliber to the cutting unit, a discharge conveyor unit with at least one portioning belt for discharging the portions in a passage direction of the slicing machine, and a spray unit including a plurality of nozzle units, wherein each nozzle unit comprises at least one spray nozzle for applying a liquid or powdery anticaking agent to a slice, wherein the spray unit comprises a holding device, and a spray bar fastened to the holding device and extending in a horizontal transverse direction to the passage direction across all tracks of the slicing machine, and wherein the nozzle units are arranged independently of one another adjustably on the spray bar, each of the nozzle units has a hollow unit housing, and for each nozzle unit, the at least one spray nozzle is arranged in a passage of a peripheral wall of the unit housing, wherein the spray bar is pivotable with respect to an axis that extends in the transverse direction to adjust a spray direction of he nozzle units, wherein the spray unit further comprises a reservoir for the anticaking agent, wherein the reservoir is connected to the spray bar and the reservoir is adjustable and fixable in a longitudinal direction of the spray bar and/or pivotable and fixable about the longitudinal direction of the spray bar.

16. The slicing machine according to claim 15, wherein each nozzle unit comprises a mountable and demountable cover for closing a longitudinal side of the unit housing, and an intermediate plate positioned in the unit housing and fastened to the unit housing, and for each nozzle unit, each of the at least one spray nozzle is attached to the intermediate plate.

17. The slicing machine according to claim 15, wherein the holding device comprises:

a main arm having a longitudinal direction, a pivoting arm which is pivotable relative to the main arm about a transverse axis that extends transverse to the longitudinal direction and to which the spray bar is attached.

18. A multi-track slicing machine for slicing calibers into slices and producing shingled or stacked portions from the slices, the slicing machine comprising:

a cutting unit, a feed unit for feeding at least one caliber to the cutting unit, a discharge conveyor unit with at least one portioning belt for discharging the portions in a passage direction of the slicing machine, and a spray unit including a plurality of nozzle units, wherein each nozzle unit comprises at least one spray nozzle for applying a liquid or powdery anticaking agent to a slice, wherein the spray unit comprises a holding device, and a spray bar fastened to the holding device and extending in a horizontal transverse direction to the passage direction across all tracks of the slicing machine, and wherein the nozzle units are arranged independently of one another adjustably on the spray bar, each of the nozzle unit has a hollow unit housing, and for each nozzle unit, the at least one spray nozzle is arranged in a passage of a peripheral wall of the unit housing, wherein the spray bar is pivotable with respect to an axis that extends in the transverse direction to adjust a spray direction of the nozzle units, wherein each nozzle unit comprises a mountable and demountable cover for closing a longitudinal side of the unit housing, and an intermediate plate positioned in the unit housing and fastened to the unit housing, and for each nozzle unit, each of the at least one spray nozzle is attached to the intermediate plate.

19. The slicing machine according to claim 18, wherein, for each nozzle unit, the intermediate plate is screwed to a wall of the unit housing from an inside of the unit housing, and each of the at least one spray nozzle is screwed to the intermediate plate.

20. The slicing machine according to claim 19, wherein the spray unit comprises a reservoir for the anticaking agent, wherein the reservoir is connected to the spray bar and the reservoir is adjustable and fixable in a longitudinal direction of the spray bar and/or pivotable and fixable about the longitudinal direction of the spray bar.

* * * * *